C. JACKSON.
Bake-Pan.

No. 204,975.     Patented June 18, 1878.

WITNESSES:
Henry N. Miller
C. Sedgwick

INVENTOR:
C. Jackson
BY
ATTORNEYS.

UNITED STATES PATENT OFFICE.

CHARLES JACKSON, OF CALIFORNIA, OHIO.

IMPROVEMENT IN BAKE-PANS.

Specification forming part of Letters Patent No. 204,975, dated June 18, 1878; application filed April 17, 1878.

*To all whom it may concern:*

Figure 1:
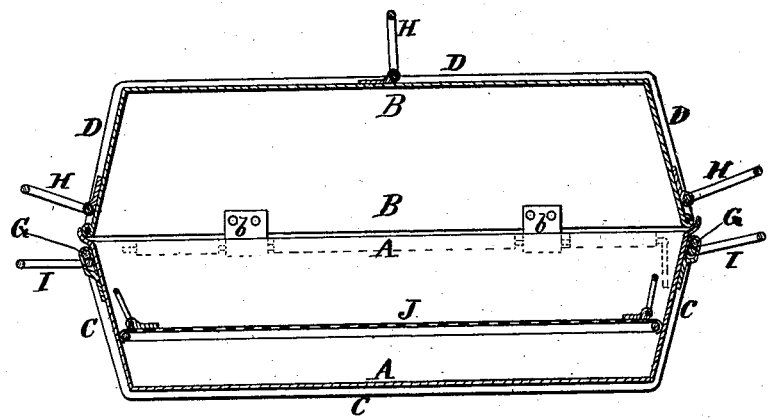
Figure 2:
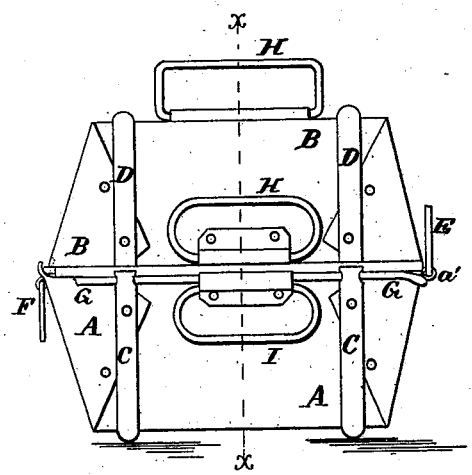

Be it known that I, CHARLES JACKSON, of California, in the county of Hamilton and State of Ohio, have invented a new and useful Improvement in Baking and Roasting Pans, of which the following is a specification:

In the accompanying drawing, forming part hereof, Figure 1 is a longitudinal section of my improved baking and roasting pan, taken through the line $x$ $x$, Fig. 2. Fig. 2 is an end view of the same.

Similar letters of reference indicate corresponding parts.

The object of this invention is to furnish an improved double pan for baking and roasting various kinds of food, popping corn, roasting coffee, and for other similar purposes, and which shall be simple in construction, strong, and durable.

The invention consists in the baking and roasting pan formed of the lower pan strengthened by the bars and wire, and having its rear edge bent over to form a socket, and its front and end edges bent over and made with an outward offset, the upper pan strengthened by the bars, having its edges wired and provided with sockets, the locking-wires, and the handles.

A is the lower pan, and B is the upper pan, which are strengthened by the iron bars C D, which pass longitudinally across their bottoms and up their ends, and are secured in place by rivets. The rear edge of the lower pan is bent over to form a socket, $a'$, for the wire E, but the forward and end edges are bent over to strengthen them, and then have an outward offset formed in them to form a seat for the edges of the upper pan B. The edges of the upper pan B are wired all around, and to its rear side are attached sockets which enter notches in the edges of the lower pan A to receive the wire E, to fasten the said pans together, and at the same time serve as a hinge. To the forward side of the upper pan are attached sockets $b'$, which pass through slots in the front offset of the lower pan to receive the wire F, to fasten the said pans together, and which is passed along the lower side of the said offset. The upper edge of the lower pan is further strengthened by the wire G, which is passed around its rear side and ends, and the ends of which overlap the forward side of the said pan A. The wire G is kept in place at the rear side of the pan A by a socket through which it passes, and which is riveted to the said pan A, and at the ends of the said pan A, by the ends of the bars C, which are notched to receive it. The upper pan B is provided with handles H at its top and ends, and the pan A is provided with handles I at its ends.

J is a grate, which is made of such a size as to rest upon the inclined sides and ends of the lower pan A at a little distance from its bottom. The grate J is designed for use when the pan is to be used for popping corn, roasting coffee, and for baking and roasting substances when it is desired that said substances should not be allowed to come in contact with the bottom of the pan, or with any grease or gravy that may be upon the said bottom.

Having thus described my invention, I claim as new and desire to secure by Letters Patent—

A baking and roasting pan formed of an upper and lower pan, A B, strengthened, respectively, by bars C D, and having locking-wires E F and handles H I, the lower pan A being bent on the edges and having an outward offset, while the upper pan B is wired on the edges and provided with sockets, as and for the purpose specified.

CHAS. JACKSON.

Witnesses:
   E. N. WILD,
   REUBEN TYLER.